United States Patent [19]

Livshin

[11] Patent Number: 5,027,547
[45] Date of Patent: Jul. 2, 1991

[54] RAT REMOVAL SYSTEM

[76] Inventor: Leo Livshin, 4828 W. Greenleaf, Skokie, Ill. 60077

[21] Appl. No.: 476,979

[22] Filed: Feb. 7, 1990

[51] Int. Cl.⁵ .......................................... A01M 23/02
[52] U.S. Cl. .......................................... 43/124; 43/98
[58] Field of Search ...................... 43/124, 58, 61, 77, 43/98, 67

[56] References Cited

U.S. PATENT DOCUMENTS

| | | | |
|---|---|---|---|
| 2,441,499 | 5/1948 | Medlin | 43/98 |
| 3,075,316 | 1/1963 | Pimentel | 43/67 |
| 4,138,796 | 2/1979 | Souza | 43/67 |
| 4,908,976 | 3/1990 | Dagenais | 43/58 |

Primary Examiner—Richard K. Seidel
Assistant Examiner—James Miner
Attorney, Agent, or Firm—Otto & Blumenthal

[57] ABSTRACT

Because of their remarkable ability to survive and multiply, methods of rat removal based on killing rats have been futile. The novel systems and methods depend on the vocalization of rats to cause rats to fire a premises. A large box trap is designed to attract several rats from a pack foraging together, wherein a spring loaded door is closed when a trigger bait is disturbed. The trap is equipped with electrical circuitry including a platen which is constrained to move up and down between the floor and the top of the trap compartment. The platen has a large number of sharp needles projecting downward therefrom. A stimulating electrical voltage is applied between the needles and the metal floor of the trap, which is selected to be effective to evoke the distress and warning calls of the rats. After a suitable interval the rats in the trap are killed by an increase applied voltage, the 115 volts of ordinary house current. Modifications are disclosed wherein the warning calls are broadcast throughout the premises, and wherein the stimulation is made adaptive to the response.

17 Claims, 5 Drawing Sheets

FIG.1

RAT REMOVAL SYSTEM

BACKGROUND OF THE INVENTION

1. Field of the Invention

The present invention relates in general to devices and systems for controlling the population of rodents in buildings and more specifically relates to an improved rodent control device and system that first captures a rodent, then stimulates the rodent to make its characteristic danger call for a period of time, then electrocutes the rodent.

2. Description of the Prior Art

A step in the novel system is to capture the rodent in a box trap. A wide variety of box traps are known in the art, as exemplified by U.S. Pat. No. 2,161,789 to Wingfield. U.S. Pat. No. 4,074,456 to Tidwell represents a box trap with electrocution.

Earlier electrocution traps as shown by U.S. Pat. Nos. 3,792,547; 3,468,054; 3,197,916; and 2,440,214; in some cases have electrocution areas which are open, and therefore unsafe, lack effective means to prevent retreat, or may permit the accumulation of odors or filth. The prior art also discloses a number of devices which generate acoustic signals which are alarming or offensive to drive out various pests. U.S. Pat. No. 4,658,386 to Morris discloses a system which generates offensive ultrasonic signals when suitable sensing means detect the presence of the target animals. However effective such means may be, they may not be appreciated by neighbors. Moreover, rats, in particular, may learn to overcome their fear of the sound. In contrast U.S. Pat. No. 4,105,992 uses the recorded sounds of young rodents to attract mature lactating female rodents for capture or destruction. Similar apparatus might use the recorded distress calls of rats to scare others away. Rats can distinguish between the voices of other rats, so that such recordings need to be changed frequently. The present invention provides the means for making and broadcasting fresh distress calls. None of the prior art provides for the use of the actual voices of rats to drive out their kin, and at the same time provides for the selective killing of those families not previously driven out.

Accordingly, it is an object of this invention to capture a rat, to repel other rats by the distress calls of the captured rat, and then to electrocute the captured rat.

SHORT STATEMENT OF THE INVENTION

The method of the inventions comprises the steps of capturing a rat, or several rats, in a box trap which has electrocution electrodes, such as an electrically conducting floor, and a movable platen at the top of the box having a plurality of sharp needles projecting downward therefrom. When the trap closes, it initiates a sequence of steps whereby the platen is first lowered to contact the rats, then a non-lethal electrical current is passed through the rats between the platen and the floor to produce an effective distress response. The platen is then raised, and the process repeated for an optimum period of time, at the end of which, the full line voltage is applied to electrocute the rat or rats. The circuit is then turned off until the animals are removed and the trap reset.

The electrical apparatus is substantially disconnected from the power mains until the trap is sprung and the box is completely closed to present a minimal electrical hazard to children or pets. For those rats that are sufficiently repelled when the first rat is trapped, the system is immediately effective. Rats prefer to move no more than a hundred feet from their nests. But in severe drought or famine rats are known to move en masse for great distances.

After one pack is driven away, the probability is that the next rat to be caught and to give the distress call will be from a pack of rats different from the first. In this way, the system automatically tends, in time, to repel all of the resident families of rats.

A feature of the novel trap which is optional is to provide a microphone and speakers to broadcast the distress calls to other rooms in the territory of the pack, such as places where the presence of the trap itself would be unseemly.

Another optional feature of the trap is that the bottom, sides, and front are readily detachable as a unit for disposing of the carcasses and for cleaning.

Another optional feature of the invention is that the program of stimulating shocks may be varied in response to the cries of the rats for optimum results.

BRIEF DESCRIPTION OF THE DRAWING FIGURES

FIG. 1 represents in a cut-away view, a simplified form of the trap of the invention, showing a box trap compartment and an electrical compartment;

METHOD

Figure 2:
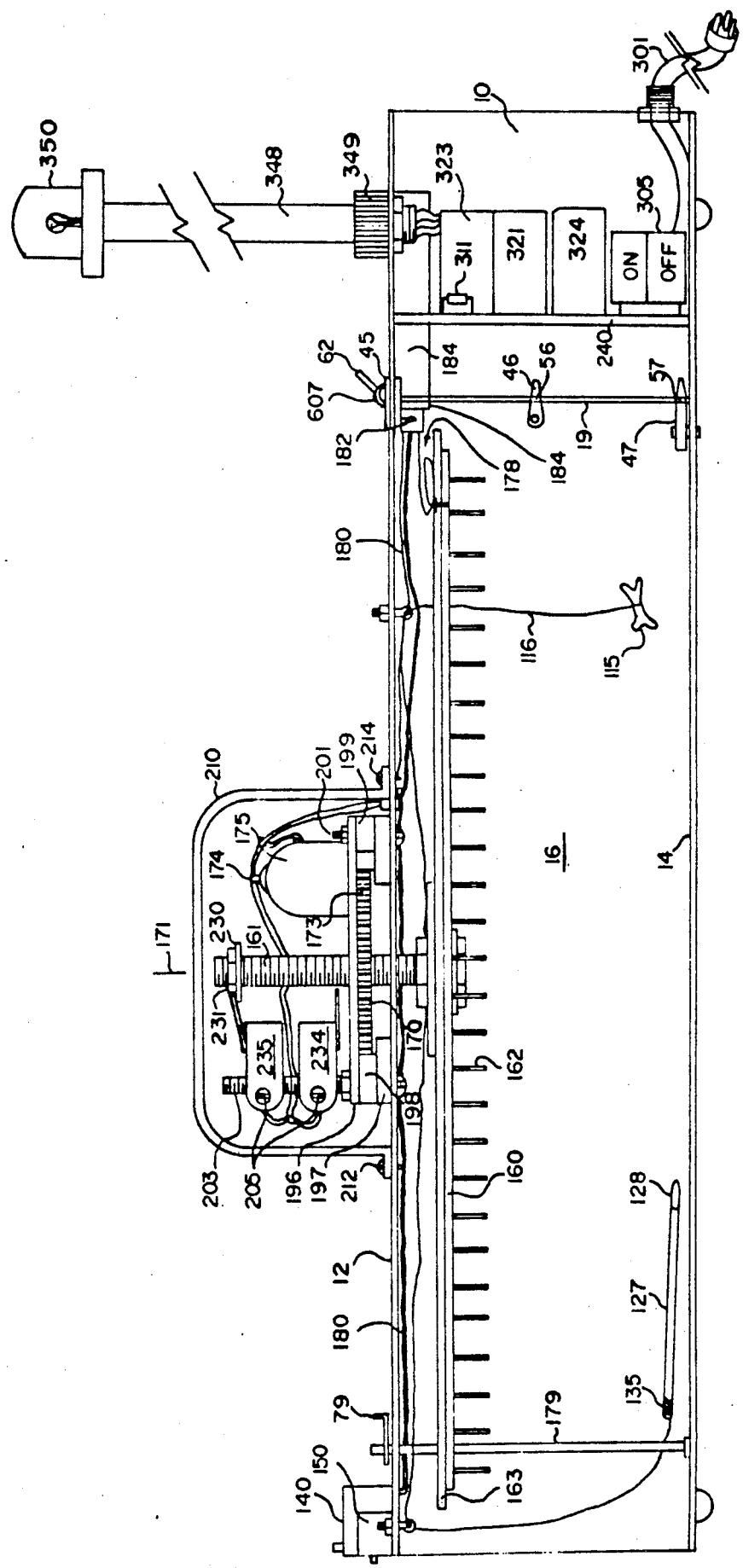
FIG. 2 shows a side view of the trap with one side removed, showing a metal platen, isulated from the sides and top by a plastic plate, from which a large number of needles project which is the upper electrode for contacting the rats, and means for raising and lowering it.

The present invention is directed to a method of eliminating rodents having the step of placing a bait within a box trap to attract the rodent into the trap, the further step of closing the trap to retain the rodent within the box thereof, and thereafter applying successive electrical stimuli to the rodent to evoke distress calls characteristics of the animal, and thereafter to kill the rodent with a final stronger electrical shock.

DETAILED DESCRIPTION OF A PREFERRED EMBODIMENT

Figure 1:
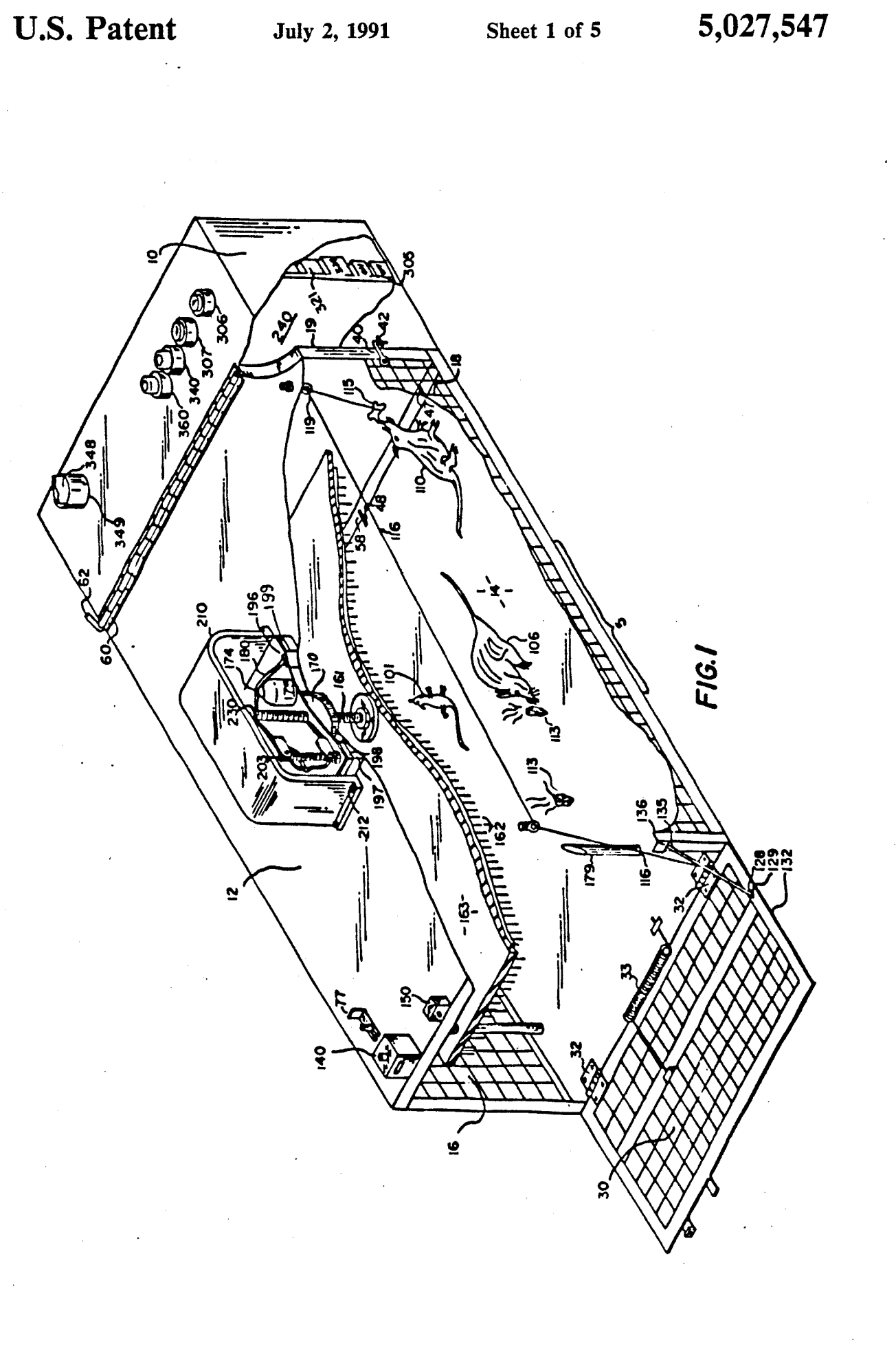

As shown in FIG. 1, a rather large trap apparatus 1 is provided comprising trap compartment 5, and an electrical compartment 10. The trap preferably is made of steel because of the ability of rats to gnaw through many materials. The top 12 and bottom 14 may be solid galvanized steel plates. The sides 16 and 18 preferably are of a suitable steel grillwork. The back 19 of the compartment 5 is a steel partition that separates that compartment from the electrical compartment 10. At the front end of the compartment 5 is a door 30, also preferably of grillwork, which in the fully-open position provides a ramp for entry into the compartment 5, and has hinges 32 at the bottom to allow the door to be swing upward by a spring 33 to close the trap compartment, which is large enough to attract several rats 101--110 to several pieces 113 of bait. When one rat 110, exploring more deeply into the enclosure reaches the trigger bait 115 which is connected by a fine monofilament line 116, or the like, which is connected through eye bolts 118 and 119 to the prop 127 which holds the door 30 in its down and open position. The prop 127, which is preferably a thin fiberglass rod has a pointed end 128 which rotates freely in the seat 129 at the edge 132 of the door 30. The other end 135 of the prop rests against a fixed boss 136 on the door frame 137. The line 116 is wrapped around the prop 127 so that as a rat pulls on the trigger bait 115, the upper end 135 is displaced from the boss 136. The angle of the boss primarily regulates the sensitivity of the trap. When triggered, the door 30 rapidly swings up, closes, and is retained by a latch 140. The prop 127 is thrown into the chamber 5, but remains loosely attached to the line 116, by which it may be retrieved. A switch 150 is operated when the door is closed; it has a normally-open contact 150a which operates a relay 321 (FIG. 3) to connect the system to the utility power mains.

A platen 160 constrained by a screw 161 to move up and down parallel to the top by suitable means, provides electrical interconnection and support for many downwardly pointing steel needles 162, spaced so that several will prod any rat that may be in the compartment when the platen is lowered. Electrical charge applied to the platen 160 is used to electrocute the rats, so it is necessary that the platen be insulated from the box. A non-conducting plastic plate 163 is fastened over the platen 160 extending beyond the platen at its edges to prevent electrical contact between the platen 160 and the top 12, the sides 16, 18, and the partition 19. The platen may be removed by removing a retaining nut 165 and washer 166.

When the switch 150 is actuated, the mechanism (not shown) contained in the electrical compartment 10 is activated, whereby the platen 160 may be raised and lowered by turning a gear 173 which is tapped on it axis to engage the screw 161 and which meshes with a gear 173 on the motor shaft 174 whereby the platen is driven by the motor 170.

Turning now to FIG. 2, the platen 160 is shown guided by vertical and parallel rods 177 and 179. An insulated spring wire 178 makes the electrical connection to the platen 160.

The platen 160 is raised and lowered by the motor 175 in the various steps of the process. Ordinarily as the platen is lowered, the sharp points will cause the rats to move downward out of the way of the sharp points. The switch 150 and the motor 175 are connected through a wiring harness 180 and connectors 182 and 184 at the partition 19 (FIG. 2) to the electrical compartment 10. Also connected through the harness 180 is a limit switch 234 which senses the contact ring 230 at the end of the screw 161 to signal that the platen 161 has reached its bottom position. The switch has a normally-closed contact 234a, and a normally-open contact 234b.

The electrical compartment also contains (see FIG. 5) a circuit board 240 which carries a circuit breaker 305, Fuses 311-313, a transformer 315, relays 321-329, and connectors 330, on its top edge 20 are mounted the "on" button 306, "off" button 307, a green light 340, and on a upwardly extending standard 348, retained by a nut, 349, 20, a rotating red light 350.

A switch 150 is operated when the door is closed and latched and operates a relay 321 (FIG. 3) to connect the working parts to the utility power mains.

Referring now to FIG. 2, an elevation view of the trap with the side 18 removed, shows a platen 160 constrained by a lead screw 161 and rods 177 and 179 to move up and down parallel to the top 12. To facilitate service and cleaning, the trap 1 comes in three parts. The electrical box 10 is attached to the sides 16 and 18, and to the bottom 14 by luggage latches shown for simplicity as a hook 40 on the side 18, and an eye 42 on the box 10. Lateral stability is provided by spade lugs 43-49, riveted to the rear edges of sides and bottom, which engage holes 53-59 in the partition 19.

The top 12 with the platen-drive assembly and the wire harness 180 is hinged to the box 10 by a piano hinge 60 with removable hinge pin 62. This top assembly is locked to notched upper ends of the rods 177 and 179 by forks 77 and 79. The non-conducting plate 163 is guided by the rods 177 and 179. An insulated wire spring 178 is plugged into the platen 160 to make a removable electrical connection to the platen. With the forks 77 and 79 pushed back, the top is free to hinge up, so that the sides 16 and 18 may, upon release of the hooks 40, be pulled forward and separated for cleaning.

Figure 3:
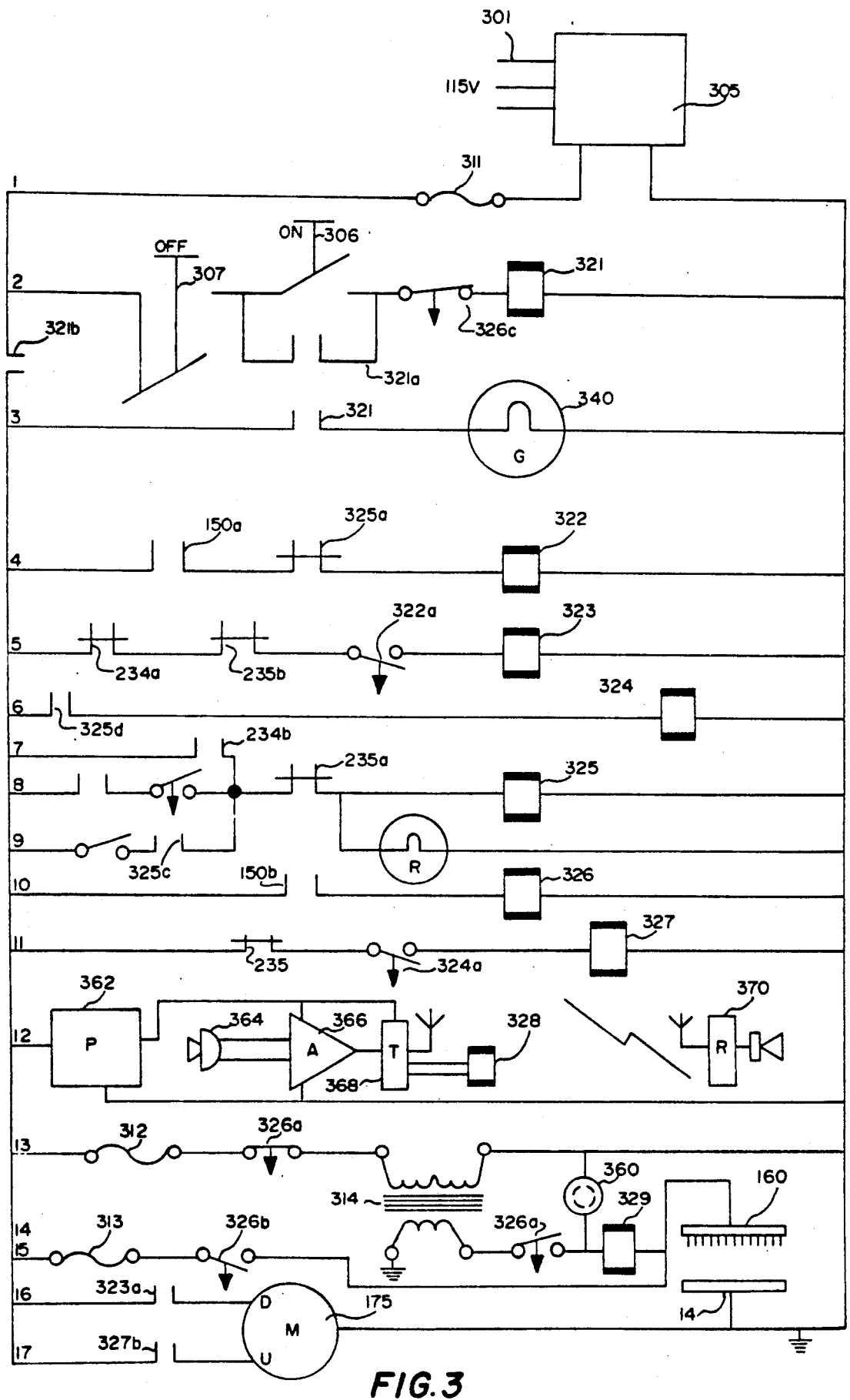
FIG. 3 is a schematic diagram of the electrical control system.

When the switch 150 is actuated, the relay 322 of FIG. 3 contained in the electrical compartment 10 is activated, starting a sequence of operations whereby the platen 160 may be raised and lowered by turning a gear 170 which is tapped on its axis 171 to engage the lead screw 161 and which meshes with a gear 173 on the motor shaft 174 whereby the platen is driven up and down by the motor 175. Ordinarily, as the platen is lowered, the sharp points will cause the rats to move downward out of the way of the sharp points. The motor 175 is connected through the wire harness 180 to the electrical compartment 10. A contacting ring 230 threaded on the screw 161 and retained by a nut 231 engages the switch 234 to sense that the platen 161 has reached its bottom position. The switch has a normally-closed contact 234a, and a normally-open contact 234b. The motor 175, the gears 170 and 173, and the lead screw 161 are all supported and located by mounting plates, an upper plate 196, and a lower plate 197 and spacers 198 and 199. The plates are stacked on and attached to the top 12 of the trap by screws 201 and 203. An extended portion of the screw 203 serves as a support for the switch 234 and a second switch 235, which senses the upper limit of the platen. The switches are attached to the screw 203 by slotted bushings which are tightened by screws 205. By adjusting the position of the ring 230 and the position of the switches on the screw 203, the limits of platen travel can be set as required. The platen drive mechanism is enclosed by a cover 210 which is fastened to the top 12 by self-tapping screws 212, 214.

Figure 5:
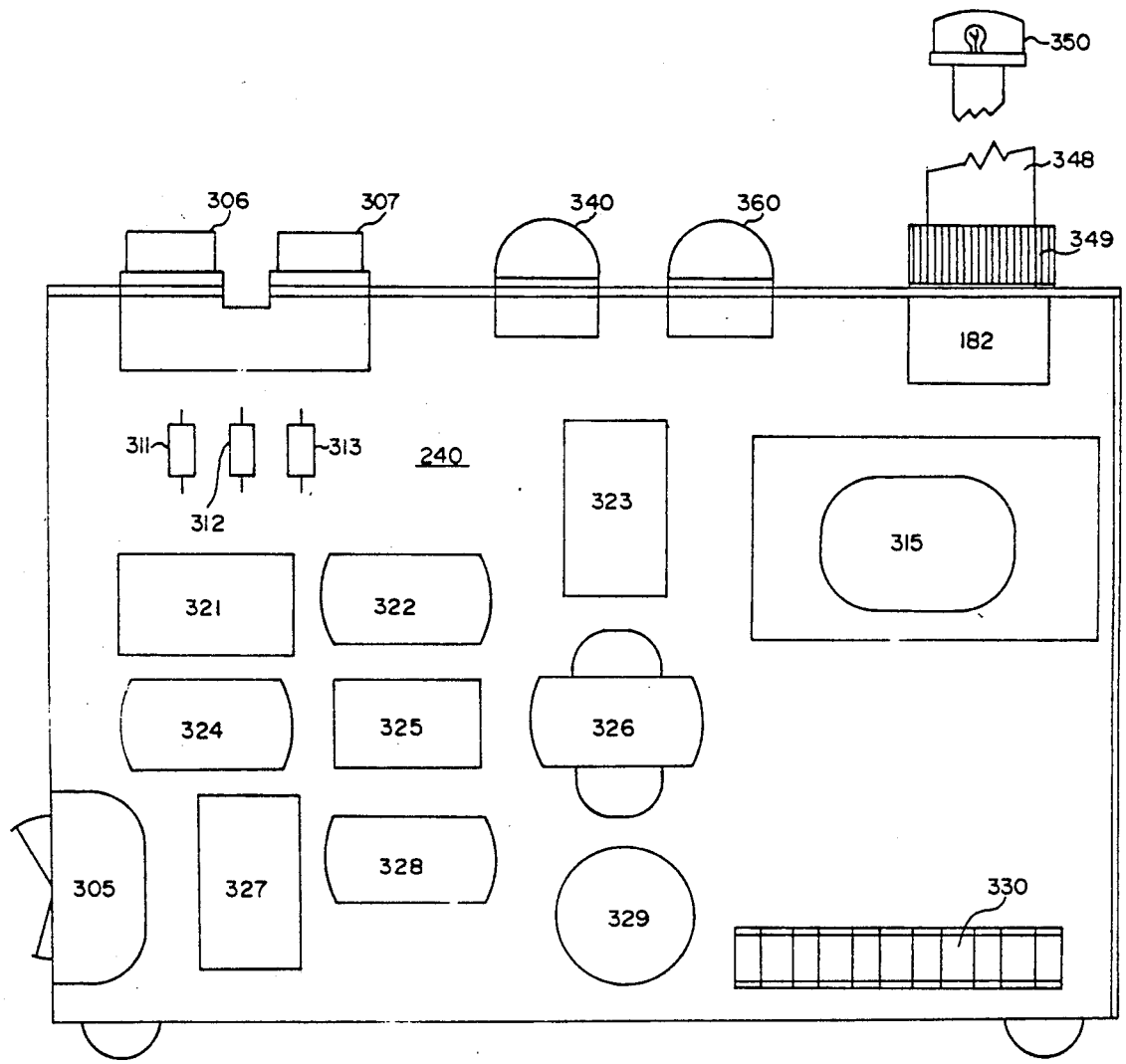
FIG. 5 is a view of the electrical panel for the system.

As further shown in FIG. 5, the electrical compartment also contains a circuit board 240 which carries a circuit breaker 305, Fuses 311-313, a transformer 315, relays 321-329, and connectors 330.

Turning now to FIG. 3 which is a schematic "ladder diagram" of the circuitry. Each relay coil is indicated by reference numbers 321 through 329, the odd numbered relays are quick acting, the even numbered relays are delayed-action. The contacts are designated by tailing letters. Thus, contact 321a, 321b, 321c, and 321d are all normally-open contacts, driven by the coil of relay 321. Contact 327a, 327c, 327d, and 327e are all normally-closed contacts and contact 327b is a normally-open contact, all driven by the coil of relay 327. Similarly, contacts 322a and 324a are slow-release, normally-open contacts on relays 322, and 324 respectively, and contact 326a is a normally-closed time-delay contact. The arrow associated with the symbol for the time-delay contacts indicates the direction of easy or fast action, making the circuit for 326b, breaking the circuit for 322a.

Electrical connection to the utility mains is made through a cord 301, which may be armored. A circuit-breaker 305 at the point of entry of the cord provides primary protection. Primary control is by a conventional push-on, push-off switches 306-307. With switch 306 on, and 307 off, the sequence of actions is as follows:

(a) Relay 321 receives voltage and works, contacts 321 a and b close. The "on" button is latched and the green pilot light 340 is lit.

(b) Door closes, and contacts 150a, line 4 and 150b, line 10 close, applying voltage to relay 322 which closes contact 322a, line 5 after a fifteen second delay, and to relay 326 which applies stimulating voltage to the platen for about an hour by contacts 326a and 326d, lines 13 and 14, which are timed to open just before lethal voltage is applied by contact 326b, line 15, and after a further, say five minutes, time releasing relay 321 and shutting the apparatus off by opening contact 321a, line 2.

(c) During the period of about four hours of application of stimulating voltage to the platen, with the mode selector switch 240 closed, the platen continues a cycle of up and down movement. Starting with the platen up so that the limit switch contacts 235a and 235b are both open, after a delay of fifteen seconds, to close contact 322a, to allow the motor to stop, relay 323 has voltage applied and voltage is then applied through contact 323a the D connection of the motor. The platen is then lowered until it reaches the lower limit, opening contact 234a on line 5.

(d) At the lower limit, relay 325 and the red light 350 receive voltage through contact 234b on line 7 and relay 323 loses voltage as contact 234a on line five opens. Voltage to terminal D of the motor is immediately cut off by contact 323a, and after a delay of sixty seconds to close contact 324a, relay 327 is energized and delivers voltage through contact 327b to motor terminal U.

(e) When the time, for example, four hours elapses. Relay 326 first opens contact 326a and 326d, then closes 326b at line 15 to apply lethal line voltage between platen and bottom, and finally opens 326c at line 2 to shut down the system.

A neon glow lamp 360 connected between ground and the hot terminal the contact 326d provides an indication when the lethal voltage is applied, yet will conduct a minimum current at the stimulating voltage.

With the mode switch 335 in the open position, an alternate mode of operation is possible. Instead of regularly cycling the platen up and down, the alternate mode uses feedback to maximize the yield of the desired product, distress calls from the rats. As long as the rats are making the desired sounds, and so long as the needles are in contact with rats, further downward pressure by the needles may be counterproductive. Accordingly, a power supply fed from the contact 321b is arranged with a microphone 364, and amplifier 366, a radio transmitter 368 and a receiver 370 and a speaker 372 are arranged to permit the rat sounds to be amplified and distributed throughout the premises. Relay coil 328 represents the means for feeding back this information to control the system. Since the rats may be expected to interrupt their output briefly from time to time, a time delay contact 328 a is arranged to remain closed until the interruption of sound persists for a predetermined interval. At the same time, a sensitive relay 329 is connected to respond to the current flowing from the platen to the base, presumedly through one or more rats. So long as this current is flowing and the vocalization continues, relay 325 is energized and contact 325b is open, deenergizing relay 323, thereby stopping the motor.

It is supposed that rats are sensitive to sounds much higher in pitch than humans are. Consequently the transmitter 368 and the receiver 370 would not likely be "off the shelf" items, but can be assembled using standard amplifiers used in F. M. and television receivers. Transmission over the electrical wiring of the building may be preferable to radio transmission.

I am familiar with relay technology and deem the above-described embodiment as preferred at this time; however, I am well aware that advances in the technology of semiconductors have supplanted relay technology in many practical arts. It will be understood that the functions and methods of this invention may be achieved with semiconductors and other means than those here specifically disclosed.

To achieve time delays of the order of hours as called for in relay 326, a cycle timer controlled by a clock mechanism is preferred. Mechanically this comprises a synchronous motor, gear train, and a disk or drum with adjustable lobes to operate contacts at the time and in the sequence required. Microcircuit digital clockwork and switches are also a possible alternative.

Figure 4:
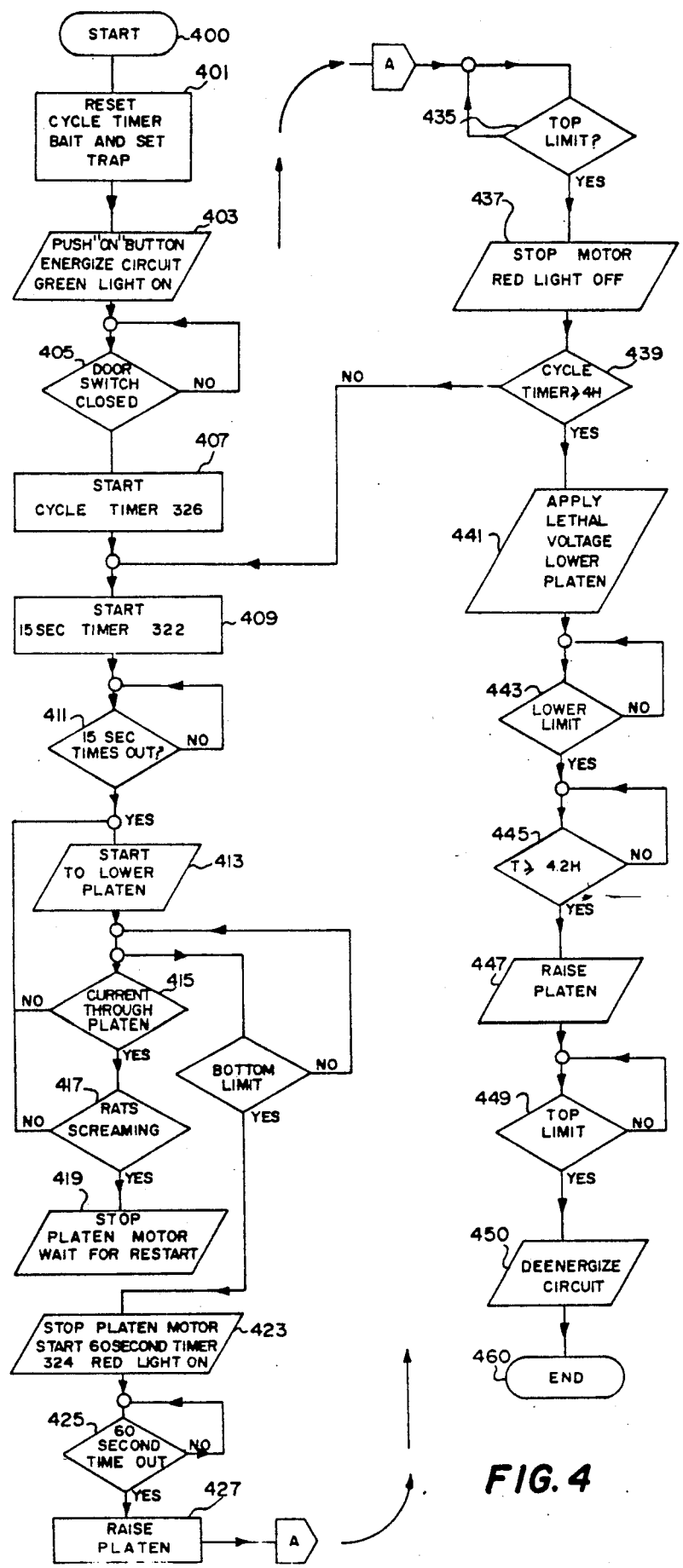
FIG. 4 is a flow chart of the method of the invention.

FIG. 4 is a Flow Chart describing in somewhat more detail the art and methods of the invention, without apparatus limitations. The system, as shown shuts down with the platen in the "up" position.

As indicated in block 401 there is a preliminary manual step in resetting the cycle timer, baiting setting the trap. At the next step, block 403, the mechanism is started with the push button 306. At block 405 it waits for the arrival of rats as indicated by the closure of the door switch 150. Then at block 407, the cycle timer is started to meter the total duration, about one hour. After a short delay begun at block 409 and seen at block 411 to expire, the platen starts down at block 413. Alternatively the stimulating voltage may then be applied to the platen if so, Blocks 415 and 417 then ask if the needles have reached a rat and if a rat is screaming, in which case the platen rests at block 419, or resets to any selected prior step. Alternatively, the platen at block 421 reaches bottom, as sensed by limit switch 234, at which point the platen drive is stopped for a delay, block 423, alternatively, if the stimulating voltage is not applied at block 413, it may be applied at block 423 and a red light turned on to indicate reaching bottom, and application of the stimulating voltage. At the end of the stop period, block 425, the platen at block 427, the platen starts upward. The platen continues upward until the limit switch 235 is reached at block 435, at which point the motor stops and the red light 350 goes off at block 437. If the cycle timer 326 is not yet at block 439 greater than or equal to a time such as four hours, the program returns to block 409, and the platen moves down. If, however, the cycle timer has reached the four hour time limit, the contact 326d opens, removing the low voltage to the platen, and contact 326b closes, applying lethal voltage at block 441, and the platen is lowered to the lower limit at block 443. After a short period, when the cycle timer 326 reaches, say 4.2 hours, at block 445, the platen is raised at block 447. When top limit is reached at block 449, the circuit is deenergized to end the process at block 450.

Until such time as the new method has been used on different species and packs of rats in different parts of the world, it cannot be said what the effective range of deterrence is in distance from the trap, whether multiple systems at one location are appropriate, and the timing of the described steps. I am most familiar with the kind of switch gear used in agricultural engineering in the Soviet Union, and the so-called "ladder logic" which is the design method. I do recognize that Boolean Logic, and semi-conductor technology may equally well, or perhaps better implement the novel methods, as defined by the appended claims.

I claim:

1. A system for removing rats from premises comprising:
   a. non-lethal means to catch and hold a rat.
   b. stimulating means to provoke the rat to respond with a distress cry, and
   c. means to prolong and repeat the distress cry,
   d. wherein said stimulating means comprises an electrical prod, and in further combination with, e. means to kill said rat.

2. A system as defined by claim 1, g. wherein said system further comprises means for catching and holding several rats.

3. A system as defined by claim 2 h. wherein said stimulating means comprises
   (1) a metal platen constrained to move up and down from the top of said box trap,
   (2) a sufficient number of electrical prods arrayed to extend downward from said platen to prod all of said rats,
   (3) motor means and switching means to cause said platen to follow a cycle of up and down motions to prolong and repeat said distress cry, and timing and switching means to connect a lethal voltage to said prods.

4. A system as defined by claim 3, i. wherein said stimulating means further comprises:
   (1) means for detecting said distress cry, and
   (2) means to interrupt said cycle for the duration of said cry.

5. A system as defined by claim 3, i. in further combination with electronic means for broadcasting said cry throughout said premises.

6. A system as defined by claim 3 i. wherein said stimulating means further comprises:
   (1) means for detecting the stimulating electrical current, and
   (2) means to interrupt said cycle responsive to said current.

7. A method for removing rats from premises comprising (revised) the steps of:
   (1) catching a rat,
   (2) restraining said rat
   (3) stimulating said rat to vocalize a warning call, and
   (4) periodically restimulating said rat to cause said call to be repeated for an hour, whereby other rats belonging to the family group of said rat are driven away.

8. The method of claim 7 with the further step of killing said rat.

9. The method of claim 8 wherein
   (a) said catching is of a leader rat with others of its pack,
   (b) said restraining is as a group in a box trap,
   (c) said stimulating is by a moderate electrical current, and
   (d) said killing is by a stronger electrical current.

10. The method of claim 8 in combination with the further step of broadcasting said call throughout said premises.

11. The method of claim 8 wherein said stimulating is accomplished by periodic application of an electrical prod.

12. The method of claim 8 wherein said stimulating is accomplished by application of an electrical prod dependent on said warning call.

13. A method for removing rats from premises comprising the steps of:
    (1) catching a rat,
    (2) restraining said rat
    (3) applying a stimulus to said rat to provoke said rat to vocalize a warning call,
    (4) removing said stimulus for a rest period,
    (5) causing such call to be repeated, spaced by further rest periods for an effective total period of time,
       whereby other rats belonging to the family group of said rat are driven away.

14. A method for removing rats from premises comprising the steps of:
    (1) catching a rat,
    (2) restraining said rat,
    (3) applying an electrical shock to said rat to provoke said rat to vocalize a warning call,
    (4) periodically over an effective period of timer reshocking said rat to repeat such calls, and
    (5) electronically amplifying and distributing said calls within the premises,
       whereby kindred rats are driven away.

15. The method of claim 14 in further combination with the further step of:
    killing said rat by an increased electrical shock.

16. A method for removing rats from premises comprising the steps of:
    (1) catching a plurality of rats,
    (2) restraining said rats
    (3) applying an electrical stimulus to said rats to provoke an effective distress response,
    (4) removing said stimulus for a rest period,
    (5) reapplying said stimulus to said rats to provoke another effective distress response,
    (6) after a rest period, reapplying said stimulus to said rats spaced by further rest periods for an effective total period of time,
       whereby kindred rats are driven away.

17. The method of claim 16, in further combination with the further step of:
    killing said rats by an increased electrical shock.

* * * * *